United States Patent
Yamada

(10) Patent No.: US 9,410,595 B2
(45) Date of Patent: Aug. 9, 2016

(54) DAMPING VALVE FOR SHOCK ABSORBER

(71) Applicant: KAYABA INDUSTRY CO., LTD., Tokyo (JP)

(72) Inventor: Hideki Yamada, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/405,163

(22) PCT Filed: Jun. 5, 2013

(86) PCT No.: PCT/JP2013/065624
§ 371 (c)(1),
(2) Date: Dec. 3, 2014

(87) PCT Pub. No.: WO2014/010343
PCT Pub. Date: Jan. 16, 2014

(65) Prior Publication Data
US 2015/0192184 A1    Jul. 9, 2015

(30) Foreign Application Priority Data
Jul. 10, 2012    (JP) .................. 2012-154190

(51) Int. Cl.
*F16F 9/348* (2006.01)
*F16F 9/32* (2006.01)

(52) U.S. Cl.
CPC .............. *F16F 9/3484* (2013.01); *F16F 9/3481* (2013.01); *F16F 9/3214* (2013.01); *F16F 9/348* (2013.01)

(58) Field of Classification Search
CPC ....... F16F 9/3484; F16F 9/3481; F16F 9/348; F16F 9/3214

USPC .................. 188/322.15, 322.22, 282.5, 282.6
See application file for complete search history.

(56) References Cited

U.S. PATENT DOCUMENTS

| | | | | |
|---|---|---|---|---|
| 2,327,295 | A * | 8/1943 | Whisler, Jr. | 188/280 |
| 4,867,286 | A * | 9/1989 | Taylor | 188/282.5 |
| 5,085,300 | A * | 2/1992 | Kato | F16F 9/348 188/280 |
| 5,148,897 | A * | 9/1992 | Vanroye | F16F 9/3482 188/282.6 |
| 5,497,862 | A * | 3/1996 | Hoya | B60G 17/0152 188/266.4 |
| 6,397,987 | B1 * | 6/2002 | Pesch | F16F 9/3214 188/322.15 |

(Continued)

FOREIGN PATENT DOCUMENTS

| | | |
|---|---|---|
| CN | 2859080 Y | 1/2007 |
| CN | 202007854 U | 10/2011 |

(Continued)

*Primary Examiner* — Thomas Irvin
(74) *Attorney, Agent, or Firm* — Rabin & Berdo, P.C.

(57) ABSTRACT

This invention obtains damping force in choke characteristics when piston speed is in low-speed region, and reduces damping force when piston speed is in medium-high-speed region. A damping valve for a shock absorber includes a piston partitioning an extension-side chamber from a pressure-side chamber, a returner laminated to pressure-side chamber side of piston, a flow passage penetrating from piston to returner and having entrance constantly communicating with expansion-side chamber, a leaf valve laminated to retainer and operably closing an exit of expansion-side flow passage, a first outer peripheral groove formed on outer periphery of piston rod. A passage T functioning as a choke is formed between first outer peripheral groove and retainer. One side of passage communicates with flow passage and other side thereof communicates with compression-side chamber.

8 Claims, 7 Drawing Sheets

(56) References Cited

U.S. PATENT DOCUMENTS

| | | | | |
|---|---|---|---|---|
| 6,460,664 B1* | 10/2002 | Steed | ............... | F16F 9/348 188/282.1 |
| 6,499,572 B2* | 12/2002 | Masamura | ............ | F16F 9/3235 188/282.1 |
| 6,860,370 B2* | 3/2005 | Nakadate | ............... | 188/282.5 |
| 6,959,906 B2* | 11/2005 | Honig et al. | ............... | 251/48 |
| 7,611,000 B2* | 11/2009 | Naito | ............... | 188/282.3 |
| 7,703,586 B2* | 4/2010 | Deferme | ............... | 188/322.13 |
| 8,302,746 B2* | 11/2012 | Azekatsu | ............... | 188/322.15 |
| 8,844,687 B2* | 9/2014 | Yu et al. | ............... | 188/280 |
| 9,068,618 B2* | 6/2015 | Yu | ............... | F16F 9/348 |
| 9,200,693 B2* | 12/2015 | Lim | ............... | F16F 9/3485 |
| 9,212,719 B2* | 12/2015 | Kim | ............... | F16F 9/348 |
| 9,249,854 B2* | 2/2016 | Kim | ............... | F16F 9/348 |
| 2006/0086581 A1 | 4/2006 | Vanbrabant | | |
| 2013/0333993 A1* | 12/2013 | Yu | ............... | 188/322.22 |
| 2015/0008083 A1* | 1/2015 | Yamada | ............... | 188/322.15 |
| 2015/0034437 A1* | 2/2015 | Yamada | ............... | 188/322.15 |
| 2015/0041269 A1* | 2/2015 | Lim | ............... | 188/322.15 |

FOREIGN PATENT DOCUMENTS

| | | |
|---|---|---|
| JP | 05-231459 A | 9/1993 |
| JP | 08-261268 A | 10/1996 |
| JP | 11-182611 A | 7/1999 |
| JP | 2005-048912 A | 2/2005 |
| JP | 2008-138696 A | 6/2008 |
| JP | 2008-309215 A | 12/2008 |

* cited by examiner

DAMPING VALVE FOR SHOCK ABSORBER

TECHNICAL FIELD

The prevent invention relates to a damping valve for a shock absorber.

BACKGROUND ART

A shock absorber is utilized to suppress vibration by being mounted in a building, a vehicle or the like. A damping valve is provided on a piston part of the shock absorber.

JP2005-48912A discloses a damping valve for a shock absorber 100. As shown in FIG. 5A, a damping valve includes a piston 101 configured to partition the interior of a cylinder S of the shock absorber 100 into an expansion-side chamber R1 and a compression-side chamber R2 filled with working fluid, a flow passage 103c formed in the piston 101 to allow communication between the expansion-side chamber R1 and the compression-side chamber R2 and a damping force generating element V laminated on a compression-side chamber side (lower side in FIG. 5A) of the piston 101 and configured to apply resistance to the working fluid moving from the expansion-side chamber R1 to the compression-side chamber R2 through the flow passage 103c.

The damping force generating element V includes a plurality of leaf valves including a choke-forming leaf valve 104c composed of first to third leaf valves 140, 141 and 142 in the form of annular plates. The first, second and third leaf valves 140, 141 and 142 are arranged in this order from a piston side.

As shown in FIG. 5B, the first leaf valve 140 includes an outer peripheral part 140a which is seated on and separated from a valve seat (not shown) of the piston 101 and through holes 140b arcuately formed along a circumferential direction at an inner side of the outer peripheral part 140a. As shown in FIG. 5C, the second leaf valve 141 includes through holes 141a arcuately formed along a circumferential direction and cuts 141b formed from the arcuate through holes 141a to an outer peripheral end. As shown in FIG. 5D, the third leaf valve 142 is in the form of a circular plate including no through hole and no cut. The through holes 140b of the first leaf valve 140 and the through holes 141a of the second leaf valve 141 are arranged to vertically overlap (FIG. 5A).

In the case of laminating the first to third leaf valves 140, 141 and 142, upper and lower openings of the cuts 141b in FIG. 5A are closed by the outer peripheral part 140a of the first leaf valve 140 and the third leaf valve 142. Further, lower openings of the through holes 141a in FIG. 5A are closed by the third leaf valve 142. In this way, the through holes 140b of the first leaf valve 140 and the through holes 141a and the cuts 141b of the second leaf valve 141 constitute a passage which allows communication between the flow passage 103c and the compression-side chamber R2, and this passage can be caused to function as a choke.

When a piston speed is in a low speed region, the outer peripheral part 140a of the first leaf valve 140 is not separated from the valve seat of the piston 101. Thus, the shock absorber 100 can generate a damping force with choke characteristics due to resistance when the working fluid passes through the passage constituted by the through holes 140b, the through holes 141a and the cuts 141b. A damping characteristic (a change of the damping force with respect to the piston speed) in this case is a proportional characteristic as indicated by a solid line f1 of FIG. 6.

When a piston speed is in a medium-high speed region, an outer peripheral part of the leaf valve 104c constituting the damping force generating element V is deflected toward a side opposite to the piston 101 and the outer peripheral part 140a of the first leaf valve 140 is separated from the valve seat of the piston 101. In this way, the shock absorber 100 generates a damping force with valve characteristics due to resistance when the working fluid passes between the first leaf valve 140 and the valve seat. A damping characteristic (a change of the damping force with respect to the piston speed) in this case is a proportional characteristic as indicated by a solid line f2 of FIG. 6.

A shock absorber including through holes, which function as orifices, in a valve seat and leaf valves generates a damping force with orifice characteristics due to resistance when working fluid passes through the through holes in the case where a piston speed is in a low speed region. A damping characteristic (a change of the damping force with respect to the piston speed) in this case is a square-law characteristic as indicated by a broken line f3 of FIG. 6. Thus, in such a shock absorber, a damping coefficient (ratio of a damping force change amount to a piston speed change amount) is small and the damping force may be possibly insufficient when the piston speed is in a predetermined range (hereinafter, referred to as a "very low speed region") from 0.

Contrary to this, in the shock absorber 100 including the passage shown in FIG. 5 which functioning as a choke, the damping characteristic when the piston speed is in the low speed region is the proportional characteristic as indicated by f1 of FIG. 6. Thus, the shortage of the damping force in the very low speed region can be suppressed.

Further, JP2008-138696A discloses a damping valve employing a divided piston structure. The damping valve includes a piston configured to partition the interior of a cylinder of a shock absorber into one chamber and another chamber filled with working fluid, a retainer (separator) laminated on another chamber side of the piston, a flow passage penetrating from the piston to the retainer and having an entrance constantly communicating with the one chamber, a leaf valve (expansion-side valve disc) in the form of an annular plate laminated on a side of the retainer opposite to the piston and configured to openably close an exit of the flow passage, and a piston rod penetrating through axial center holes of the piston, the retainer and the leaf valve.

The damping valve generates a damping force with valve characteristics similarly to the shock absorber 100 disclosed in JP2005-48912A. Further, in this damping valve, even if the flow passage passes on an inner peripheral side of the piston, the annular valve seat, on and from which the leaf valve is seated and separated, can be formed on the retainer to have a larger diameter. Thus, the leaf valve can be made larger in diameter and more easily deflected. Therefore, a damping coefficient (ratio of a damping force change amount to a piston speed change amount) when the piston speed is in the medium-high speed region can be made smaller.

SUMMARY OF INVENTION

The shock absorber needs to include both the choke forming leaf valve and the retainer to obtain a damping force with choke characteristics when the piston speed is in the low speed region and to make the damping coefficient when the piston speed is in the medium-high speed region smaller. However, in this case, the number of the laminated leaf valves is increased by including the choke forming leaf valve, wherefore it is difficult to sufficiently reduce the damping coefficient when the piston speed is in the medium-high speed region.

This invention aims to provide a damping valve for a shock absorber capable of suppressing a damping coefficient when a piston speed is in a medium-high speed region while generating a damping force with choke characteristics when the piston speed is in a low speed region.

According to one aspect of the present invention, a damping valve for a shock absorber includes a valve disc configured to partition one chamber and another chamber, a retainer laminated on another chamber side of the valve disc, a flow passage penetrating from the valve disc to the retainer and having an entrance constantly communicating with the one chamber, an annular plate-shaped leaf valve laminated on a side of the retainer opposite to the valve disc and configured to openably close an exit of the flow passage, a shaft member penetrating through axial center holes of the valve disc, the retainer and the leaf valve, a first outer peripheral groove formed on the outer periphery of the shaft member, and a passage formed between the first outer peripheral groove and the retainer and configured to function as a choke. One side of the passage communicates with the flow passage and the other side of the passage communicates with the other chamber.

Embodiments of the present invention and advantages thereof are described in detail below with reference to the accompanying drawings.

DESCRIPTION OF EMBODIMENTS

First, a first embodiment is described.

Figure 1:
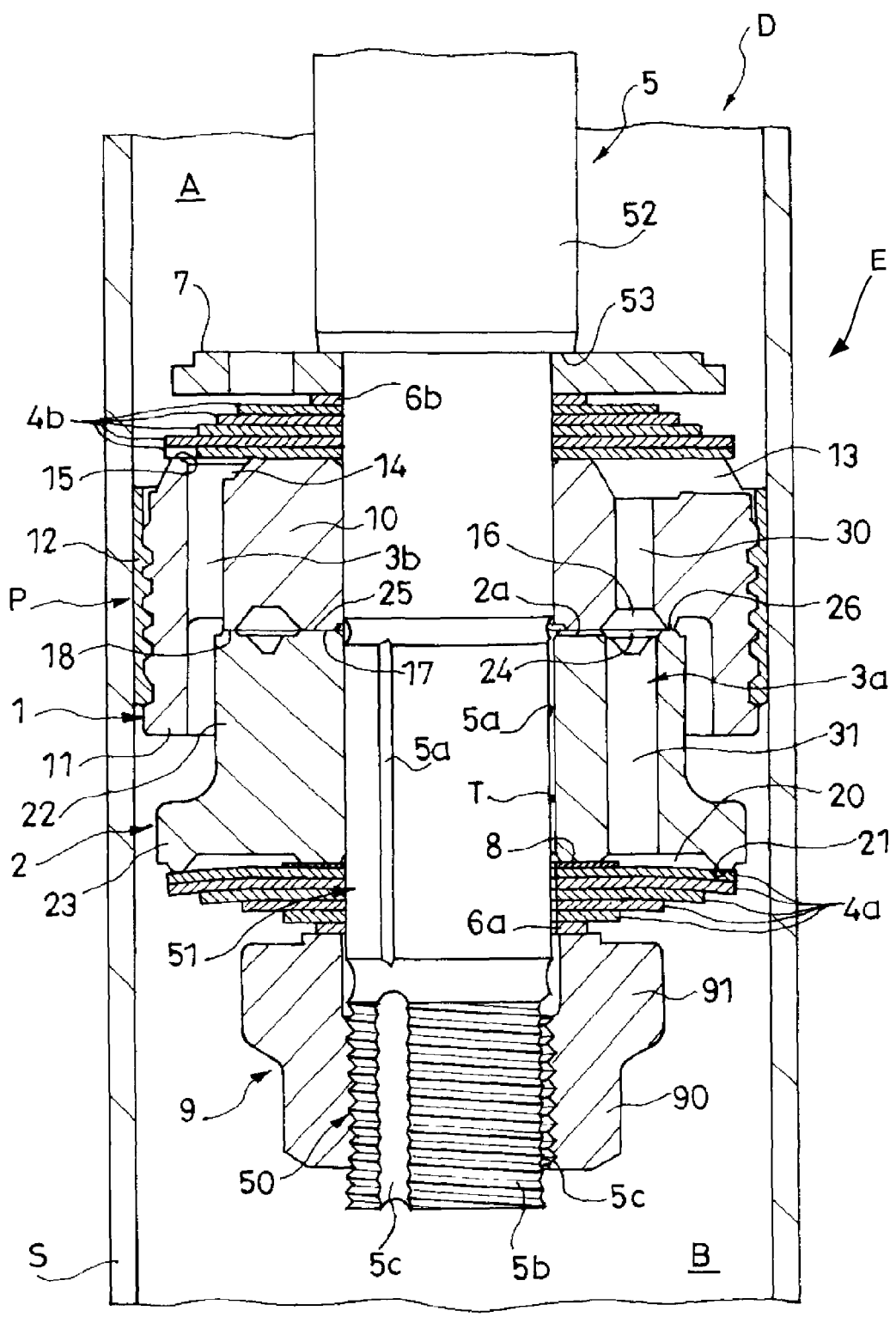
FIG. 1 is a vertical sectional view showing a damping valve for a shock absorber according to a first embodiment of the present invention.

FIG. 1 is a vertical sectional view showing a damping valve E for a shock absorber D according to the first embodiment of the present invention. It should be noted that, in the following description, the same reference signs shown throughout a plurality of drawings denote the same or corresponding members.

The damping valve E provided on a piston part of the shock absorber D includes a piston (valve disc) 1 configured to partition an expansion-side chamber (one chamber) A and a compression-side chamber (another chamber) B, a retainer 2 laminated on a compression-side chamber side (other chamber side) of the piston 1, an expansion-side flow passage (flow passage) 3a penetrating from the piston 1 to the retainer 2 and having an entrance constantly communicating with the expansion-side chamber A, annular plate-shaped leaf valves 4a laminated on a side of the retainer 2 opposite to the piston 1 (side opposite to the valve disc) and configured to operably close an exit of the expansion-side flow passage 3a, and a piston rod (shaft member) 5 penetrating through axial center holes (not shown) of the piston 1, the retainer 2 and the leaf valves 4a.

The damping valve E further includes a first outer peripheral groove 5a formed on the outer periphery of the piston rod 5 and a passage T formed between the first outer peripheral groove 5a and the retainer 2 which functioning as a choke. One side of the passage T communicates with the expansion-side flow passage 3a and the other side thereof communicates with the compression-side chamber B.

The shock absorber D includes a cylinder S which stores working fluid composed of liquid such as oil, water or aqueous solution, the piston rod 5 which is retractably inserted into the cylinder S and the piston 1 which is held on the tip of the piston rod 5 and slides in contact with the inner peripheral surface of the cylinder S. In the cylinder S, the expansion-side chamber A and the compression-side chamber B filled with the working fluid are partitioned by the piston 1, the expansion-side chamber A is arranged on a piston rod side (upper side in FIG. 1) of the piston 1 and the compression-side chamber B is arranged on a side opposite to the piston rod 5 (lower side in FIG. 1).

The shock absorber D further includes a known reservoir which is partitioned from the compression-side chamber B by a base member and stores the working fluid, and a known air chamber which is partitioned from the compression-side chamber B by a free piston and expandable and contractible. The reservoir or air chamber compensates for a volume change in the cylinder equivalent to a volume of the piston rod 5 inserted into and retracted from the cylinder S and a volume change of the working fluid due to a temperature change.

It should be noted that since the damping valve E is provided on the piston part in the present embodiment, "one chamber" and "another chamber" in claims respectively correspond to the expansion-side chamber A and the compression-side chamber B and a "valve disc" in claims corresponds to the piston 1. However, if a structure is employed in which the damping valve E is provided on a part of the base member, the "one chamber" and the "other chamber" in claims respectively correspond to the compression-side chamber B and the reservoir and the "valve disc" in claims corresponds to the base member.

A plurality of leaf valves 4b, a spacer 6b and a valve stopper 7 are successively laminated from a piston side on an expansion-side chamber side (upper side in FIG. 1) of the piston 1. The retainer 2, a shim 8, a plurality of leaf valves 4a and a spacer 6a are successively laminated from a piston side on the compression-side chamber side (lower side in FIG. 1) of the piston 1. Each of the piston 1 and the retainer 2 is formed into an annular shape and includes an axial center hole (not shown) penetrating through an axial central part thereof. Further, each of the leaf valves 4a, 4b, the valve stopper 7, the shim 8 and the spacers 6a, 6b is formed into an annular shape and includes an axial center hole (not shown) penetrating through an axial central part thereof.

The piston rod 5 retractably inserted into the cylinder S includes a screw part 50 arranged on a tip part and having a screw groove 5b formed on the outer periphery and a mounting part 51 coaxially continuous with a base end side (upper side in FIG. 1) of the screw part 50. Outer diameters of the screw part 50 and the mounting part 51 are smaller than that of a part 52 continuous with a base end side (upper side in FIG. 1) of the mounting part 51 and an annular step surface 53 is formed on a boundary thereof.

The screw part 50 and the mounting part 51 of the piston rod 5 are inserted successively through the axial center holes of the valve stopper 7, the spacer 6b on the expansion-side chamber side, the leaf valves 4b on the expansion-side chamber side, the piston 1, the retainer 2, the shim 8, the leaf valves 4a on the compression-side chamber side and the spacer 6a on the compression-side chamber side (hereinafter, referred to as the "piston and the like P"), and a nut 9 is threadably engaged with the screw part 50 projecting from the piston and the like P, whereby the piston and the like P are held between the nut 9 and the step surface 53.

Although inner peripheral sides of the plurality of leaf valves 4a, 4b arranged on each of the expansion-side chamber side (upper side in FIG. 1) and the compression-side chamber side (lower side in FIG. 1) of the piston 1 are fixed to the piston rod 5 by being sandwiched between the step surface 53 and the nut 9, an outer peripheral side of each leaf valve 4a, 4b can be deflected in a direction away from the piston 1. Further, the leaf valves 4a arranged on the compression-side chamber side (lower side in FIG. 1) are initially deflected, and this deflection amount can be adjusted by using a shim 8 having a different thickness or changing the number of laminated shims 8.

The nut 9 to be threadably engaged with the screw part 50 of the piston rod 5 includes a nut main body 90 to be threadably engaged with the outer periphery of the screw part 50 and an annular standing part 91 standing from the nut main body 90. An inner diameter of the standing part 91 is larger than the outer diameters of the screw part 50 and the mounting part 51. Thus, in the case of threadably engaging the nut main body 90 with the screw part 50, the standing part 91 reaches the mounting part 51 beyond the screw part 50.

The piston 1 includes a piston main body 10 formed with two types of flow passages allowing communication between the expansion-side chamber A and the compression-side chamber B, i.e. the expansion-side flow passage 3a and a compression-side flow passage 3b, a tubular skirt part 11 extending toward the retainer from an outer peripheral part of a compression-side chamber side (lower side in FIG. 1) of the piston main body 10 and a slide contact part 12 mounted from the outer periphery of the piston main body 10 to that of the skirt part 11 and configured to slide in contact with the inner peripheral surface of the cylinder S.

The expansion-side flow passage 3a penetrates from the piston 1 to the retainer 2 and includes a valve disc through hole 30 formed on an inner peripheral side of the piston main body 10 and a retainer through hole 31 formed on the retainer 2. An entrance of the expansion-side flow passage 3a is connected to an opening window 13 formed on an expansion-side chamber side surface (upper surface in FIG. 1) of the piston main body 10 and constantly communicates with the expansion-side chamber A via the opening window 13. An exit of the expansion-side flow passage 3a is connected to a window 20 formed on a compression-side chamber side surface (lower surface in FIG. 1) of the retainer 2 and the outer periphery of the window 20 is surrounded by an annular valve seat 21. The leaf valves 4a on the compression-side chamber side can allow and block the communication of the expansion-side flow passage 3a by having outer peripheral parts thereof seated on and separated from the valve seat 21. That is, the exit of the expansion-side flow passage 3a is openably closed by the leaf valves 4a on the compression-side chamber side.

The compression-side flow passage 3b penetrates only through the piston 1 and is formed on an outer peripheral side of the piston main body 10. An entrance of the compression-side flow passage 3b is open toward an inner side of the skirt part 11 and constantly communicates with the compression-side chamber B. An exit of the compression-side flow passage 3b is connected to a window 14 formed on an expansion-side chamber side surface (upper surface in FIG. 1) of the piston main body 10 and partitioned from the opening window 13 (expansion-side flow passage 3a) by a petal-shaped valve seat 15 surrounding the outer periphery of the window 14. The leaf valves 4b on the expansion-side chamber side can allow and block the communication of the compression-side flow passage 3b by having outer peripheral parts thereof seated on and separated from the valve seat 15. That is, the exit of the compression-side flow passage 3b is openably closed by the leaf valves 4b on the expansion-side chamber side.

The retainer 2 laminated on the compression-side chamber side (lower side in FIG. 1) of the piston 1 includes a small outer diameter part 22 to be inserted into an inner peripheral side of the skirt part 11 of the piston 1 and a larger outer diameter part 23 coaxially continuous with a side of the small outer diameter part 22 opposite to the piston 1 (lower side in FIG. 1) and having a larger outer diameter than that of the small outer diameter part 22.

An axial length of the small outer diameter part 22 of the retainer 2 is so set that a part of the small outer diameter part 22 projects from the skirt part 11 when the small outer diameter part 22 is inserted into the inside of the skirt part 11. Further, the outer diameter of the large outer diameter part 23 is smaller than an inner diameter of the cylinder S. This enables the working fluid to move between the outer periphery of the retainer 2 and the inner periphery of the cylinder S and prevents the retainer 2 from closing the entrance of the compression-side flow passage 3b formed in the piston main body 10. Further, outer diameters of the leaf valves 4a on the compression-side chamber side can be made larger by making an outer diameter of the valve seat 21 formed on the retainer 2.

An annular groove 16 continuous with the valve disc through hole 30, an annular inner peripheral seating surface 17 standing along the inner periphery of the annular groove 16 and an annular outer peripheral seating surface 18 standing along the outer periphery of the annular groove 16 are formed on a mating surface (lower surface in FIG. 1) of the piston 1 facing the retainer 2. Further, an annular groove 24 continuous with the retainer through hole 31, an annular inner peripheral seating surface 25 standing along the inner periphery of the annular groove 24 and an annular outer peripheral seating surface 26 standing along the outer periphery of the annular groove 24 are formed on a mating surface (upper surface in FIG. 1) of the retainer 2 facing the piston 1.

When the mounting part 51 of the piston rod 5 is inserted into the axial center holes of the piston and the like P and the nut 9 is threadably engaged with the screw part 50, the both outer peripheral seating surfaces 18, 26 are held in close contact. Thus, the working fluid passing in the expansion-side flow passage 3a does not leak out from between the both outer peripheral seating surfaces 18, 26. Further, since the valve disc through hole 30 and the retainer through hole 31 communicate via the both annular grooves 16, 24, the valve disc through hole 30 and the retainer through hole 31 can be allowed to communicate even if being circumferentially displaced.

Figure 2:
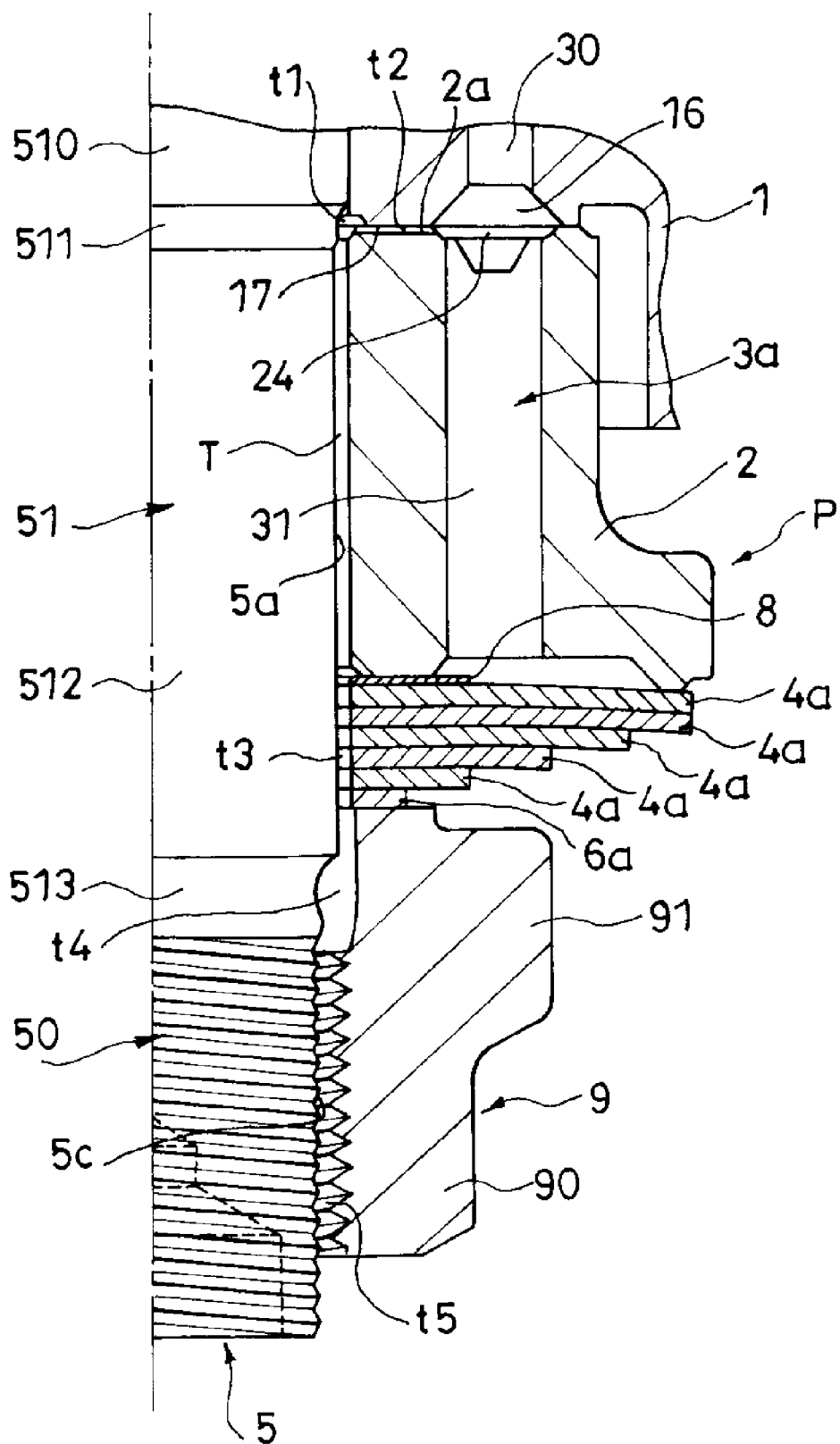
FIG. 2 is an enlarged view enlargedly showing a part of FIG. 1.

FIG. 2 is an enlarged view enlargedly showing a part of FIG. 1.

The mounting part 51 of the piston rod 5 on which the piston and the like P are to be mounted is composed of a piston holding part 510 continuous with the step surface 53 (FIG. 1), a small diameter part 511 continuous with a side (lower side in FIG. 2) of the piston holding part 510 opposite to the step surface 53 and having an outer diameter smaller than that of the piston holding part 510, a retainer holding part 512 continuous with a side (lower side in FIG. 2) of the small diameter part 511 opposite to the piston holding part 510 and having an outer diameter equal to that of the piston holding part 510, and a non-screw part 513 provided between the retainer holding part 512 and the screw part 50 and having an outer diameter smaller than those of the retainer holding part 512 and the screw part 50.

The piston 1, the leaf valves 4b, the spacer 6b and the valve stopper 7 on the expansion-side chamber side are mounted on the outer periphery of the piston holding part 510 (FIG. 1), and the retainer 2, the shim 8, the leaf valves 4a and the spacer 6a on the compression-side chamber side are mounted on the outer periphery of the retainer holding part 512 (FIGS. 1, 2).

A first outer peripheral groove 5a is formed from a small diameter part side end (upper end in FIG. 2) to a non-screw part side end (lower end in FIG. 2) of the retainer holding part 512 on the outer periphery of the mounting part 51 of the piston rod 5, and the passage T functioning as a choke is formed between the first outer peripheral groove 5a and the retainer 2.

The small diameter part 511 of the mounting part 51 is arranged at a position facing the both mating surfaces of the piston 1 and the retainer 2 and an annular first communication passage t1 communicating with the passage T is formed between the small diameter part 511 and the piston 1, the retainer 2. A groove 2a is formed along a radial direction on the inner peripheral seating surface 17 of the retainer 2, and a second communication passage t2 communicating with the first communication passage t1 and the expansion-side flow passage 3a is formed between the groove 2a and the inner peripheral seating surface 17 of the piston 1. That is, one side of the passage T functioning as a choke communicates with the expansion-side flow passage 3a via the first and second communication passages t1, t2.

A third communication passage t3 is formed between the outer peripheral groove 5a formed on the outer periphery of the mounting part 51 of the piston rod 5 and the shim 8, the leaf valves 4a on the compression-side chamber side, the spacer 6a and the standing part 91 of the nut. An annular fourth communication passage t4 communicating with the third communication passage t3 is formed between the non-screw part 513 of the mounting part 51 and the standing part 91 of the nut 9. A second outer peripheral groove 5c is formed from a mounting part side end (upper end in FIG. 2) to the tip (lower end in FIG. 2) on the outer periphery of the screw part 50 of the piston rod 5. A fifth communication passage t5 communicating with the fourth communication passage t4 and the compression-side chamber B is formed between the second outer peripheral groove 5c and the nut main body 90. That is, the other side of the passage T functioning as a choke communicates with the compression-side chamber B via the third, fourth and fifth communication passages t3, t4 and t5.

It should be noted that since the third and fifth communication passages t3, t5 communicate via the annular fourth communication passage t4, the third and fifth communication passages t3, t5 may be circumferentially displaced. Further, the fourth communication passage t4 (non-screw part 513) may be omitted and the third and fifth communication passages t3, t5 may be continuously formed.

The damping valve E of the shock absorber D is configured as described above. When a speed of the piston vertically moving in the cylinder S in FIG. 1 according to the extension and contraction of the shock absorber D is in a low speed region, the outer peripheral parts of the leaf valves 4a, 4b on the expansion-side chamber side and the compression-side chamber side are not separated from the valve seats 21, 15 of the retainer 2 and the piston 1. Thus, the working fluid moves between the expansion-side chamber A and the compression-side chamber B through the passage T functioning as a choke. Therefore, the shock absorber D generates a damping force with choke characteristics due to resistance when the working fluid passes through the passage T.

During the extension of the shock absorber D during which the piston 1 moves upward in FIG. 1, the working fluid in the expansion-side chamber A pressurized by the piston 1 deflects the outer peripheral parts of the leaf valves 4a on the compression-side chamber side toward the side opposite to the piston 1 and moves to the compression-side chamber B through the expansion-side flow passage 3a when the piston speed increases beyond the low speed region and reaches a medium-high speed region. Thus, the shock absorber D generates a damping force with valve characteristics due to resistance when the working fluid passes between the leaf valves 4a on the compression-side chamber side and the valve seat 21.

During the contraction of the shock absorber D during which the piston 1 moves downward in FIG. 1, the working fluid in the compression-side chamber B pressurized by the piston 1 deflects the outer peripheral parts of the leaf valves 4b on the expansion-side chamber side toward the side opposite to the piston 1 and moves to the expansion-side chamber A through the compression-side flow passage 3b when the piston speed increases beyond the low speed region and reaches the medium-high speed region. Thus, the shock absorber D generates a damping force with valve characteristics due to resistance when the working fluid passes between the leaf valves 4b on the expansion-side chamber side and the valve seat 15.

It should be noted that although the piston speed region is divided into the low speed region and the medium-high speed region to explain changes of the damping characteristic in the above description, a speed on a boundary between these regions can be arbitrarily set.

Functions and effects of the damping valve E of the shock absorber D in the present embodiment are described.

The damping valve E of the shock absorber D includes the piston 1 configured to partition the expansion-side chamber A and the compression-side chamber B, the retainer 2 laminated on the compression-side chamber side of the piston 1, the expansion-side flow passage 3a penetrating from the piston 1 to the retainer 2 and having the entrance constantly communicating with the expansion-side chamber A, the leaf valves 4a in the form of annular plates laminated on the side of the retainer 2 opposite to the piston 1 and configured to openably close the exit of the expansion-side flow passage 3a, and the piston rod 5 penetrating through the axial center holes of the piston 1, the retainer 2 and the leaf valves 4a.

The damping valve E further includes the first outer peripheral groove 5a formed on the outer periphery of the piston rod 5 and the passage T formed between the first outer peripheral groove 5a and the retainer 2 which functioning as a choke, and the one side of the passage T communicates with the expansion-side flow passage 3a and the other side thereof communicates with the compression-side chamber B.

That is, since the retainer 2 is laminated on the piston 1 and the expansion-side flow passage 3a penetrates from the piston 1 to the retainer 2, the outer diameters of the leaf valves 4a for openably closing the exit of the expansion-side flow passage 3a can be made larger even if the expansion-side flow passage 3a is formed on the inner peripheral side of the piston 1 and the compression-side flow passage 3b is formed on the outer peripheral side of the piston 1. Thus, the damping coefficient when the piston speed is in the medium-high speed region can be made smaller.

Further, since the passage T functioning as a choke is formed between the piston rod 5 and the retainer 2, the working fluid can pass through the passage T and move between the expansion-side chamber A and the compression-side chamber B when the piston speed is in the low speed region. Thus, the shock absorber D can generate a damping force with choke characteristics.

Further, since the leaf valves 4a for openably closing the exit of the expansion-side flow passage 3a need not be the conventional choke forming leaf valves 104c, the number of the laminated leaf valves 4a needs not be increased unlike before. Thus, even if the shock absorber D can generate a damping force with choke characteristics when the piston speed is in the low speed region, an increase in the damping coefficient when the piston speed is in the medium-high speed region can be suppressed.

Further, the piston rod 5 includes the screw part 50 arranged on the tip part and having the nut 9 threadably engaged with the outer periphery and the mounting part 51 continuous with the base end side (upper side in FIG. 1) of the screw part 50 and having the piston 1, the retainer 2 and the leaf valves 4a on the compression-side chamber side mounted on the outer periphery, and the mounting part 51 includes the small diameter part 511 arranged at the position facing the mating surface of each of the piston 1 and the retainer 2.

The annular first communication passage t1 communicating with the passage T is formed between the small diameter part 511 and the piston 1, the retainer 2, and the second communication passage t2 communicating with the first communication passage t1 and the expansion-side flow passage 3a is formed along the radial direction between the piston 1 and the retainer 2.

Thus, the one side of the passage T functioning as a choke can communicate with the expansion-side flow passage 3a via the first and second communication passages t1, t2, and the second communication passage t2 and the passage T can communicate via the first communication passage t1 even if being circumferentially displaced.

Further, the first outer peripheral groove 5a extends up to a position facing the leaf valves 4a on the compression-side chamber side and the third communication passage t3 for allowing the passage T to communicate with the compression-side chamber B is formed between the first outer peripheral groove 5a and the leaf valves 4a on the compression-side chamber side.

Thus, the passage T can be allowed to communicate with the compression-side chamber B utilizing the outer peripheral groove 5a for forming the passage T functioning as a choke without specially processing the leaf valves 4a on the compression-side chamber side.

Further, the second outer peripheral groove 5c is formed on the outer periphery of the screw part 50 and the fifth communication passage t5 for allowing the passage T to communicate with the compression-side chamber B is formed between the second outer peripheral groove 5c and the nut 9. Thus, it is also possible to use the fifth communication passage t5 as a second passage functioning as a choke. In this case, a length of the choke can be made longer.

Further, the mounting part 51 includes the retainer holding part 512 having the retainer 2 and the leaf valves 4a on the compression-side chamber side mounted on the outer periphery and the non-screw part 513 arranged between the retainer holding part 512 and the screw part 50 and having the outer diameter smaller than those of the retainer holding part 512 and the screw part 50.

The nut 9 includes the nut main body 90 to be threadably engaged with the screw part 50 and the annular standing part 91 standing on the nut main body 90. The annular fourth communication passage t4 is formed between the non-screw part 513 and the standing part 91 and the third and fifth communication passages t3, t5 communicate via the fourth communication passage t4.

Thus, the third and fifth communication passages t3, t5 can be allowed to communicate via the fourth communication passage t4 even if being vertically separately formed and circumferentially displaced. Further, depths and widths of the first and second outer peripheral grooves 5a, 5c can be respectively freely set and a damping force with choke characteristics of the shock absorber D can be more freely set.

Further, the retainer 2 includes the small outer diameter part 22 and the large outer diameter part 23 coaxially continuous with the side of the small outer diameter part 22 opposite to the piston 1 (side opposite to the valve disc) and having the outer diameter larger than that of the small outer diameter part 22. Thus, even if the compression-side flow passage 3b is formed on the outer peripheral side of the piston main body 10, it can be easily prevented that the entrance of the compression-side flow passage 3b is closed by the retainer 2.

Further, since the valve seat 21 on and from which the leaf valves 4a on the compression-side chamber side are seated and separated is formed on the large outer diameter part 23, the outer diameters of the leaf valves 4a on the compression-side chamber side can be made larger by easily making the outer diameter of the valve seat 21 larger.

Next, a second embodiment is described.

Figure 3:
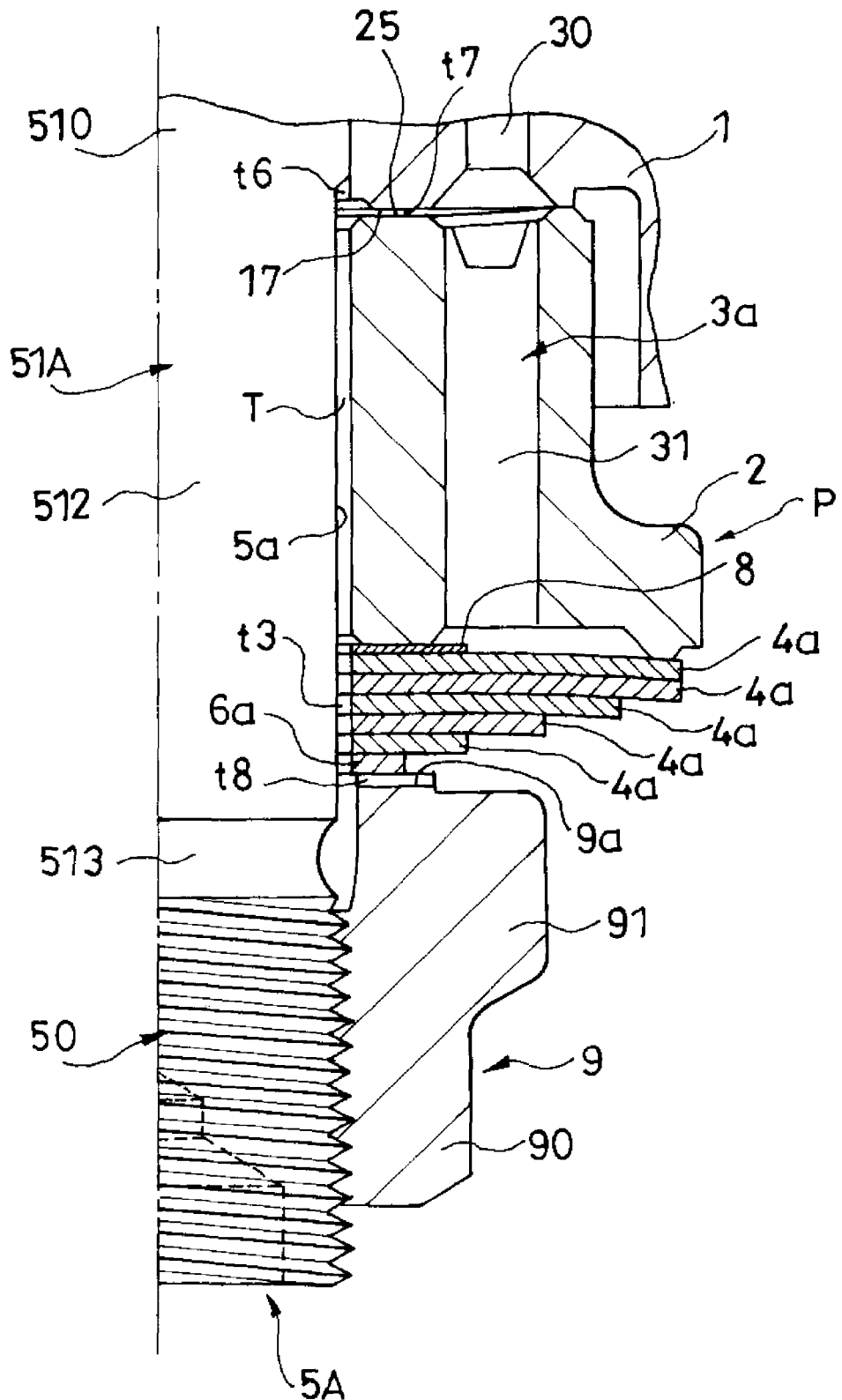
FIG. 3 is a vertical sectional view enlargedly showing a part of a damping valve for a shock absorber according to a second embodiment of the present invention.

FIG. 3 is a vertical sectional view enlargedly showing a part of a damping valve E for a shock absorber D according to the second embodiment of the present invention. The damping valve E of the shock absorber D of the present embodiment differs from the first embodiment in a structure for allowing one side of the passage T to communicate with the expansion-side flow passage 3a and a structure for allowing the other side of the passage T to communicate with the compression-side chamber B, and the other structure is similar to the first embodiment. Thus, the same members as in the first embodiment are denoted by the same reference signs and are not described.

A piston rod (shaft member) 5A includes a screw part 50 arranged on a tip part and having a screw groove 5b formed on the outer periphery and a mounting part 51A coaxially continuous with a base end side (upper side in FIG. 3) of the screw part 50 as in the first embodiment. Outer diameters of the screw part 50 and the mounting part 51A are smaller than that of a part 52 (FIG. 1) continuous with a base end side of the mounting part 51A and an annular step surface 53 (FIG. 1) is formed on a boundary thereof.

The mounting part 51A is composed of a piston holding part 510 continuous with the step surface 53, a retainer holding part 512 continuous with a side of the piston holding part 510 opposite to the step surface 53 and having an outer diameter equal to that of the piston holding part 510, and a non-screw part 513 provided between the retainer holding part 512 and the screw part 50 and having an outer diameter smaller than those of the retainer holding part 512 and the screw part 50.

A piston 1, leaf valves 4b, a spacer 6b and a valve stopper 7 on an expansion-side chamber side are mounted on the outer periphery of the piston holding part 510 (FIG. 1), and a retainer 2, a shim 8, leaf valves 4a and a spacer 6a on a compression-side chamber side are mounted on the outer periphery of the retainer holding part 512 (FIG. 3).

A first outer peripheral groove 5a is formed on the mounting part 51A of the piston rod 5A. The first outer peripheral groove 5a is provided from a retainer holding part side end part (upper end part in FIG. 3) of the piston holding part 510 to a non-screw part side end (lower end in FIG. 3) of the retainer holding part 512. A sixth communication passage t6 is formed between the first outer peripheral groove 5a and the piston 1, a passage T functioning as a choke is formed between the first outer peripheral groove 5a and the retainer 2 and a third communication passage t3 is formed between the outer peripheral groove 5a and the shim 8, the leaf valves 4a and the spacer 6a on the compression-side chamber side and a standing part 91 of a nut.

An inner peripheral seating surface 25 of the retainer 2 is arranged on a tip side of the piston rod 5A (lower side in FIG. 3) than an outer peripheral seating surface 26. This causes the piston and the like P to be fixed to the outer periphery of the piston rod 5A and the inner peripheral seating surface 25 of the retainer 2 does not come into contact with the inner peripheral seating surface 17 of the piston 1 even if the outer peripheral seating surface 26 of the retainer 2 and the outer peripheral seating surface 18 of the piston 1 come into contact. Thus, an annular seventh communication passage t7 communicating with an expansion-side flow passage 3a is formed between the piston 1 and the retainer 2.

Further, a groove 9a is formed along a radial direction on a piston side surface (upper surface in FIG. 3) of the standing part 91 of the nut 9 in contact with the spacer 6a on the compression-side chamber side, and an eighth communication passage t8 communicating with the third communication passage t3 and the compression-side chamber B is formed between the groove 9a and the spacer 6a.

That is, in the present embodiment, one side of the passage T functioning as a choke communicates with the expansion-side flow passage 3a via the sixth and seventh communication passages t6, t7 and the other side communicates with the compression-side chamber B via the third and eighth communication passages t3, t8.

Functions and effects of the damping valve E in the present embodiment are described.

As in the first embodiment, the damping valve E of the shock absorber D includes the first outer peripheral groove 5a formed on the outer periphery of the piston rod (shaft member) 5A and the passage T formed between the first outer peripheral groove 5a and the retainer 2 and functioning as a choke, the one side of the passage T communicates with the expansion-side flow passage 3a and the other side thereof communicates with the compression-side chamber B.

Since the passage T functioning as a choke is formed between the piston rod 5A and the retainer 2 in this way, working fluid can move between an expansion-side chamber A and the compression-side chamber B through the passage T when a piston speed is in a low speed region. Thus, the shock absorber D can generate a damping force with choke characteristics.

Further, since the leaf valves 4a for openably closing an exit of the expansion-side flow passage 3a need not be the conventional choke forming leaf valves 104c, the number of the laminated leaf valves 4a needs not be increased unlike before. Thus, even if the shock absorber D can generate a damping force with choke characteristics when the piston speed is in the low speed region, an increase in the damping coefficient when the piston speed is in a medium-high speed region can be suppressed.

Further, the first outer peripheral groove 5a extends up to a position facing the piston 1, whereby the sixth communication passage t6 communicating with the passage T is formed between the first outer peripheral groove 5a and the piston 1. Further, since the annular seventh communication passage t7 communicating with the sixth communication passage t6 and the expansion-side flow passage 3a is formed along the radial direction between the piston 1 and the retainer 2, the one side of the passage T communicates with the expansion-side flow passage 3a via the sixth and seventh communication passages t6, t7. Thus, unlike the piston rod 5 of the first embodiment, it is not necessary to provide the small diameter part 511.

Further, the damping valve E includes the spacer 6a in the form of an annular plate laminated at a side of the leaf valves 4a on the compression-side chamber side opposite to the piston 1.

The mounting part 51A of the piston rod 5A includes the retainer holding part 512 having the retainer 2, the leaf valves 4a and the spacer 6a on the compression-side chamber side mounted on the outer periphery and the non-screw part 513 arranged between the retainer holding part 512 and the screw part 50 and having the outer diameter smaller than those of the retainer holding part 512 and the screw part 50. The first outer peripheral groove 5a extends up to the non-screw part side end of the retainer holding part 512.

The nut 9 includes a nut main body 90 to be threadably engaged with the screw part 50 and the annular standing part 91 standing from the nut main body 90. An inner diameter of the standing part 91 is larger than the outer diameter of the retainer holding part 512 and the groove 9a is formed along the radial direction on the piston side surface of the standing part 91.

The third communication passage t3 communicating with the passage T is formed between the first outer peripheral groove 5a and the leaf valves 4a, the spacer 6a and the standing part 91 on the compression-side chamber side and the eighth communication passage t8 communicating with the third communication passage t3 and the compression-side chamber B is formed between the groove 9a formed on the nut 9 and the spacer 6a.

Thus, even if the nut 9 is retained by caulking the tip of the piston rod 5A projecting from the nut 9, a state of communication between the passage T and the compression-side chamber B can be maintained. Further, since an annular clearance is formed between the retainer holding part 512 of the piston rod 5A and the standing part 91, the third and eighth communication passages t3, t8 can be allowed to communicate even if the first outer peripheral groove 5a and the groove 9a of the standing part 91 are circumferentially displaced.

Figure 4:
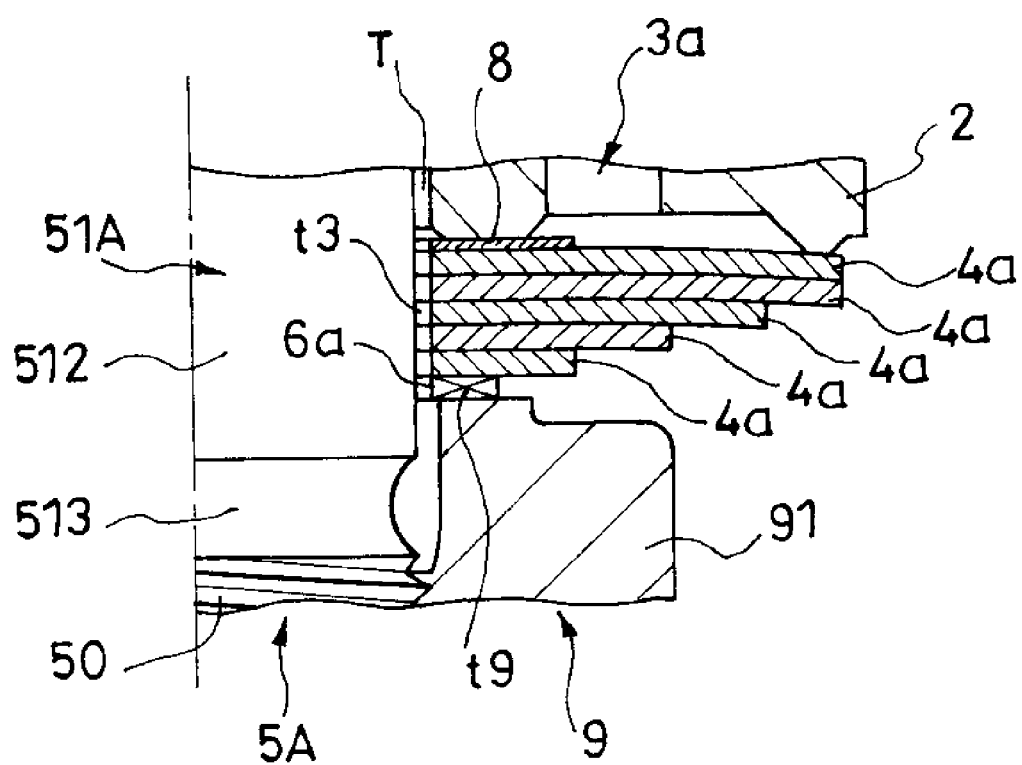
FIG. 4 is a vertical sectional view showing a modification of the damping valve of the shock absorber according to the second embodiment of the present invention.
Figure 5A:
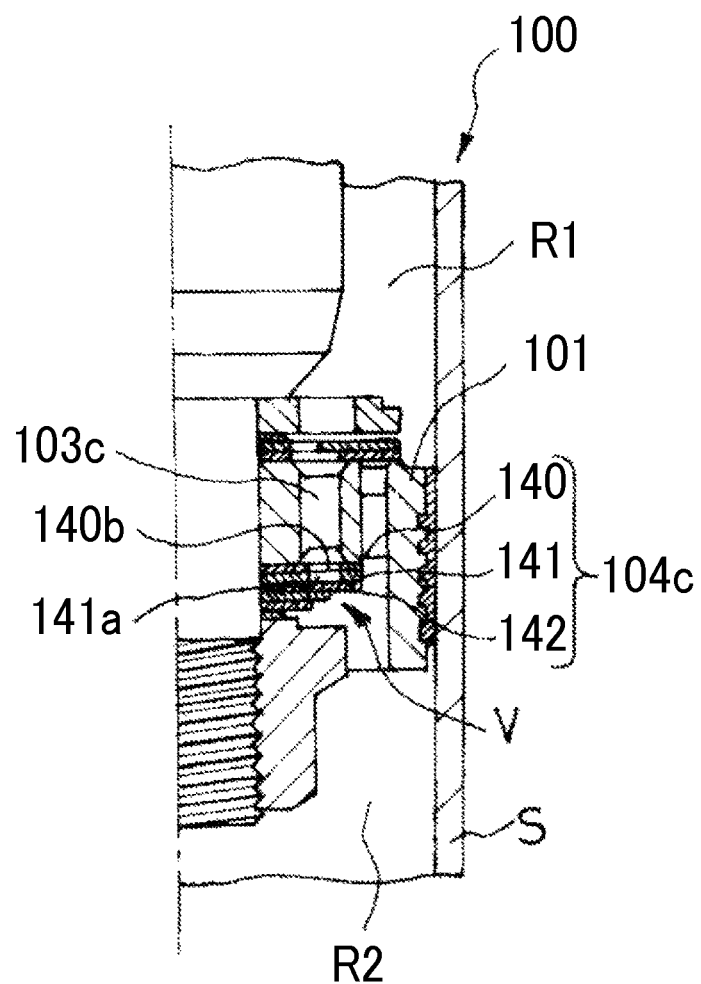
FIG. 5A is a vertical sectional view showing a part of a damping valve of a conventional shock absorber.
Figure 5B:
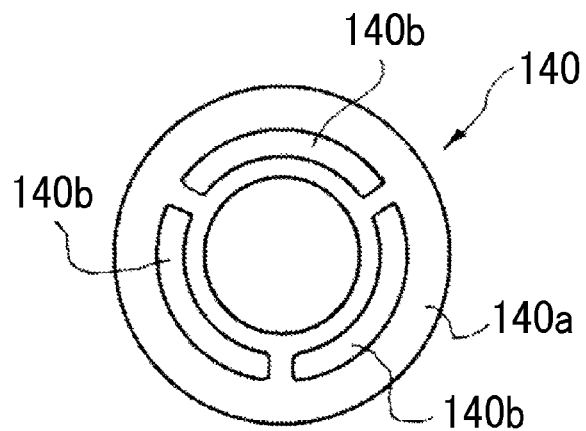
FIG. 5B is a plan view showing a first leaf valve in the damping valve of the conventional shock absorber.
Figure 5C:
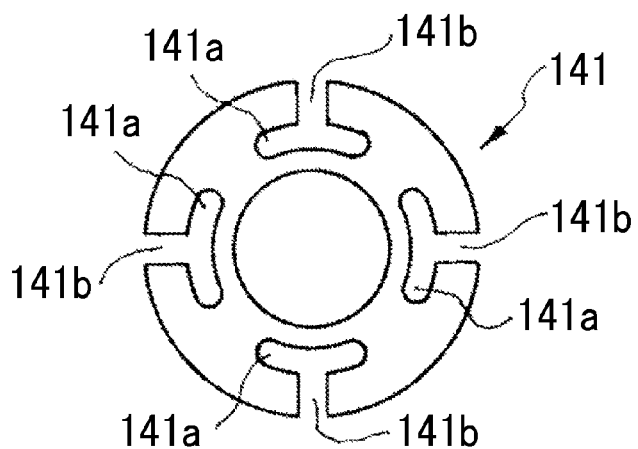
FIG. 5C is a plan view showing a second leaf valve in the damping valve of the conventional shock absorber.
Figure 5D:
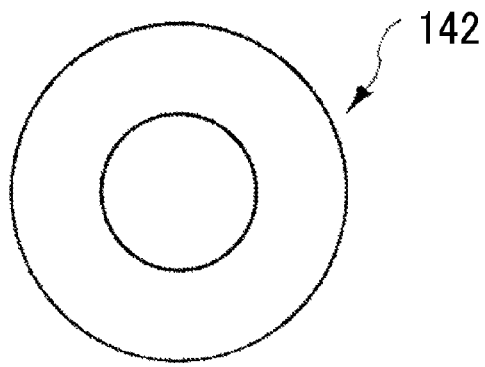
FIG. 5D is a plan view showing a third leaf valve in the damping valve of the conventional shock absorber.
Figure 6:
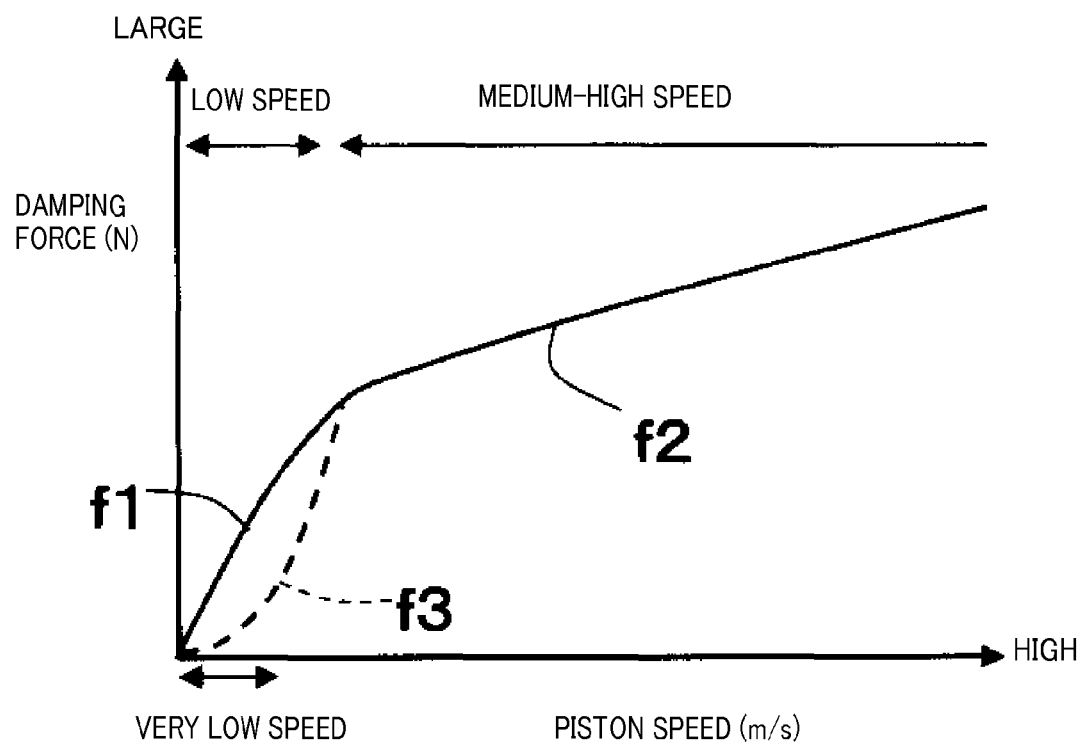
FIG. 6 is a graph showing a damping characteristic of the shock absorber mounted with the conventional damping valve.

It should be noted that, instead of forming the eighth communication passage t8, the spacer 6a on the compression-side chamber side may be formed into a C shape and a ninth communication passage t9 communicating with the third communication passage t3 and the compression-side chamber B may be provided between facing ends of the spacer 6a, as shown in FIG. 4. Further, a groove may be provided along a radial direction on the spacer 6a and a communication passage communicating with the third communication passage t3 and the compression-side chamber B may be provided between this groove and the nut 9 or the leaf valves 4a laminated on the spacer 6a. Further, a groove may be provided along a radial direction on any one of the leaf valves 4a on the compression-side chamber side and a communication passage communicating with the third communication passage t3 and the compression-side chamber B may be provided between this groove and the spacer 6a or another leaf valve 4a.

Embodiments of this invention were described above, but the above embodiments are merely examples of applications of this invention, and the technical scope of this invention is not limited to the specific constitutions of the above embodiments.

For example, although a case where the damping valve E of the shock absorber D is provided on the piston part of the shock absorber D has been illustrated in the above embodiments, the damping valve E may be provided on a part of the base member of the shock absorber D.

Further, although the shock absorbers D of the above embodiments are fluid pressure shock absorbers using liquid as the working fluid, they may be pneumatic shock absorbers using gas as the working fluid.

Further, although the retainer 2 is laminated on the compression-side chamber side and the flow passage penetrating from the piston 1 to the retainer 2 is formed as the expansion-side flow passage 3a, which constantly communicates with the expansion-side chamber A and in which the working fluid passes during the extension of the shock absorber D, in the above embodiments, the retainer 2 may be laminated on the expansion-side chamber side and the flow passage penetrating from the piston 1 to the retainer 2 may be formed as a compression-side flow passage, which constantly communicates with the compression-side chamber B and in which the working fluid passes during the contraction of the shock absorber D.

Further, the configuration for allowing the passage T formed between the first outer peripheral groove 5a formed on the outer periphery of the piston rod 5 and the retainer 2 which functioning as a choke to communicate with the expansion-side flow passage 3a and the configuration for allowing the passage T to communicate with the compression-side chamber B are not limited to those described above and can be appropriately changed.

Further, although a plurality of the first and second outer peripheral grooves 5a, 5b are provided in an axial direction of the piston rod 5 in the above embodiments, the shapes and numbers of the first and second outer peripheral grooves 5a, 5c can be appropriately selected. For example, the first and second outer peripheral grooves 5a, 5c may be spirally formed.

This application claims priority based on Japanese Patent Application No. 2012-154190 filed with the Japan Patent Office on Jul. 10, 2012, the entire contents of which are incorporated into this specification.

The invention claimed is:

1. A damping valve for a shock absorber, comprising:
a valve disc configured to partition a first chamber and a second chamber;
a retainer provided on a second chamber side of the valve disc, the retainer having an inner peripheral surface;
a flow passage penetrating the valve disc and the retainer and constantly communicating with the first chamber;
an annular plate-shaped leaf valve provided on a side of the retainer opposite to the valve disc to open and close a communication of the flow passage with the second chamber;
a shaft member penetrating the valve disc, the retainer and the leaf valve, the shaft member having a central axis and an outer periphery facing the inner peripheral surface of the retainer; and
a first outer peripheral groove formed on the outer periphery of the shaft member and along the central axis,
wherein the first outer peripheral groove and the inner peripheral surface of the retainer form a choke passage having a flow characteristic of a choke and connecting the first chamber and the second chamber.

2. The damping valve for the shock absorber according to claim 1, wherein:
the damping valve further comprises a third communication passage formed between the first outer peripheral groove and the leaf valve to connect the choke passage to the second chamber.

3. The damping valve for the shock absorber according to claim 1, wherein
the retainer includes a small outer diameter part and a large outer diameter part coaxially continuous with the small outer diameter part on a side of the small outer diameter part opposite to the valve disc, the large outer diameter part having an outer diameter larger than that of the small outer diameter part.

4. The damping valve for the shock absorber according to claim 1, wherein the shaft member is made of a solid shaft.

5. The damping valve for the shock absorber according to claim 1, wherein the flow passage extends from a top surface of the retainer to a bottom surface of the retainer.

6. A damping valve for a shock absorber, comprising:
a valve disc configured to partition a first chamber and a second chamber;
a retainer provided on a second chamber side of the valve disc;
a flow passage penetrating the valve disc and the retainer and constantly communicating with the first chamber;
an annular plate-shaped leaf valve provided on a side of the retainer opposite to the valve disc to open and close a communication of the flow passage with the second chamber;
a shaft member penetrating the valve disc, the retainer and the leaf valve, the shaft member having an outer periphery;
a first outer peripheral groove formed on the outer periphery of the shaft member,
the first outer peripheral groove forming a choke passage having a flow characteristic of a choke and connecting the first chamber and the second chamber between the first outer peripheral groove and the retainer,
wherein:
the shaft member includes a tip part on which a screw part engaging with a nut is formed, a base end, and a mounting part formed between the base end and the screw part to mount the valve disc, the retainer, and the leaf valve on the outer periphery;
the valve disc and the retainer have mating surfaces and the mounting part includes a small diameter part arranged at a position facing the mating surfaces;
the damping valve further comprises
an annular first communication passage formed in a space surrounded by the small diameter part, the valve disc, and the retainer to communicate with the choke passage; and
a second communication passage formed along a radial direction between the valve disc and the retainer to connect the first communication passage and the flow passage.

7. The damping valve for the shock absorber according to claim 6, wherein the screw part comprises an outer periphery, and the damping valve further comprises:
a second outer peripheral groove formed on the outer periphery of the screw part, the second outer peripheral groove forming a fifth communication passage between the second outer peripheral groove and the nut to connect the choke passage to the second chamber.

8. A damping valve for a shock absorber, comprising:
a valve disc configured to partition a first chamber and a second chamber;
a retainer disposed on a same side of the valve disc as the second chamber;
a flow passage penetrating from the valve disc to the retainer and having an entrance constantly communicating with the first chamber;
an annular plate-shaped leaf valve provided on a side of the retainer opposite to the valve disc and configured to openably close an exit of the flow passage;
a shaft member penetrating through axial center holes of the valve disc, the retainer and the leaf valve, the shaft member including a screw part which is arranged on a tip part and with which a nut is to be threadably engaged, and a mounting part which is continuous with a base end side of the screw part and which has the valve disc, the retainer and the leaf valve mounted on an outer periphery of the mounting part, the mounting part including a small diameter part arranged at a position facing a mating surface of each of the valve disc and the retainer;
a first outer peripheral groove formed on an outer periphery of the shaft member;
a choke passage formed between the first outer peripheral groove and the retainer and configured to function as a choke, one side of the choke passage communicating with the flow passage and another side of the choke passage communicating with the second chamber;
an annular first communication passage communicating with the choke passage and formed between the small diameter part and the valve disc, the annular first communication passage further being formed between the small diameter part and the retainer;
a second communication passage communicating with the first communication passage and the flow passage and formed along a radial direction between the valve disc and the retainer;
a second outer peripheral groove formed on an outer periphery of the screw part; and
a fifth communication passage configured to allow the choke passage to communicate with the second chamber and formed between the second outer peripheral groove and the nut.

* * * * *